June 17, 1958  B. BARÉNYI ET AL  2,839,312
COMBINED SEATING AND STEERING ARRANGEMENT FOR VEHICLES
Filed May 18, 1955  2 Sheets-Sheet 1

INVENTORS
BELA BARENYI AND
WERNER K.H.F. GRÄMKOW
BY Dicke and Craig
ATTORNEYS.

June 17, 1958   B. BARÉNYI ET AL   2,839,312
COMBINED SEATING AND STEERING ARRANGEMENT FOR VEHICLES
Filed May 18, 1955   2 Sheets-Sheet 2

INVENTORS
BELA BARENYI AND
WERNER K. H. F. GRÄMKOW
BY Dicke and Craig.
ATTORNEYS.

United States Patent Office 2,839,312
Patented June 17, 1958

2,839,312

COMBINED SEATING AND STEERING ARRANGEMENT FOR VEHICLES

Béla Barényi, Stuttgart-Hohenheim, and Werner K. H. F. Grämkow, Stuttgart-Sillenbuch, Germany, assignors to Daimler-Benz Aktiengesellschaft, Stuttgart-Unterturkheim, Germany Application May 18, 1955, Serial No. 509,276

Public Law 619, August 23, 1954
Patent expires October 27, 1969

9 Claims. (Cl. 280—87)

This invention relates to a motor vehicle, particularly a light or softly sprung passenger car. An essential factor in such vehicles is the number of persons present in the car. If these are unevenly distributed on the seats, the vehicle, circumstances permitting, may become markedly inclined towards one side thereof, which on the one hand causes an unpleasant sensation among the passengers and on the other gives the vehicle an unesthetic appearance. At the same time, the springing properties of the car are impaired as a result of the inclined position of the car body and the uneven load on the springs.

Such lateral inclination of the car body has a particularly marked effect in vehicles having three seats arranged side by side and the steering gear operated from the center seat. If in this instance only one additional seat besides the central, driver's seat is occupied, the full weight of this companion has the effect of canting the car body without being counter-balanced by a corresponding weight on the opposite side of the vehicle.

One object of this invention is, therefore, to provide an improved distribution of weights with regard to the arrangement of the seats, particularly in vehicles designed for side-by-side arrangement of three seats.

Another object of the invention is to provide an arrangement of the steering gear operating device, particularly the steering handwheel, corresponding to the particular arrangement of the seats.

One feature of the invention is, therefore, an arrangement whereby in the case of 3 seats arranged side by side, the center seat, for instance, the driver's seat, and one of the two side seats are movable transversely to the vehicle center line for use of only two seats arranged side by side, such arrangement consisting particularly in enabling said two seats, viewed in the direction of travel of the vehicle, to be moved into a symmetrical position relative to the vehicle center plane. The third seat may be the folding type, for instance, an emergency seat.

The invention offers the advantage that when the vehicle, i. e., the seats arranged side by side, are occupied by two persons only, the seats can be distributed relative to the vehicle center plane so that their weights are substantially balanced and inclination of the car body is thereby prevented.

The invention is more particularly described with reference to the accompanying drawings in which.

Figure 1:
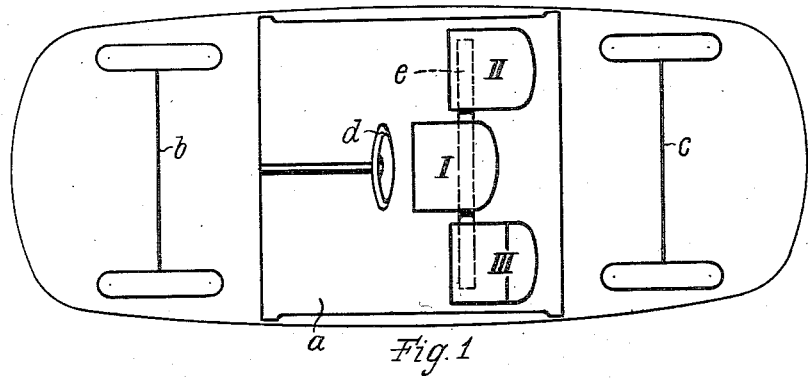
Fig. 1 is a plan view of a vehicle having three seats arranged side by side.

In all embodiments shown, $a$ is the outline of the passenger space, $b$ the front axle, $c$ the rear axle and $d$ the steering handwheel of the vehicle arranged in the vehicle center plane M—M. Reference numerals I, II and III indicate the three seats arranged side by side, I being the driver's seat and II and III the somewhat set back companion's seats. The seats, or part thereof, are slideably arranged transversely to the vehicle center line on a guide $e$, for instance on the vehicle floor, or in any desired manner.

In Fig. 1, the three seats I, II, III are symmetrically arranged side by side. Only the driver's seat, for instance, need be the built-in type if appropriate. Corresponding to the arrangement of the steering handwheel, the driver's seat is located in the center plane of the vehicle.

The side seats II and III may be arranged transversely in line with the driver's seat or, for instance as shown, somewhat set back therefrom. If all of the three seats are occupied, weights are distributed symmetrically to the vehicle center plane.

However, if the car is occupied by two persons only, an uneven distribution of weights will result in any case, irrespective of whether seats I and II or I and III are occupied. In order to obtain a weight balance or a symmetrical distribution of weights, the driver's seat I and, for instance, the companion's seat II, are transversely slideably arranged so that said two seats can be moved to the position shown in full lines in Fig. 2. The third seat III is here shown in its folded-up position.

Figure 2:
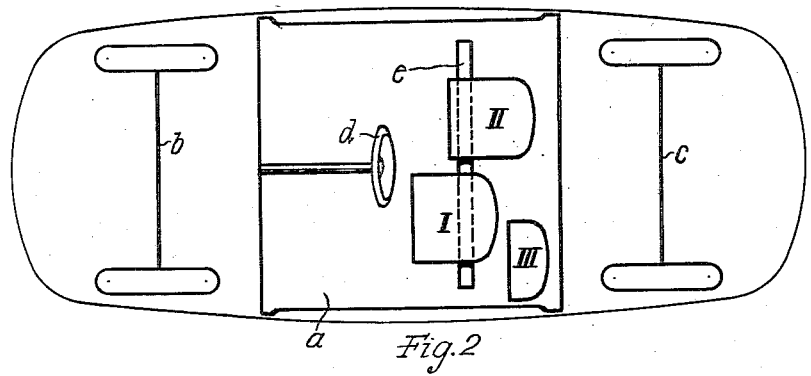
Fig. 2 is a plan view of the same vehicle with only two of the three seats in use.
Figure 3:
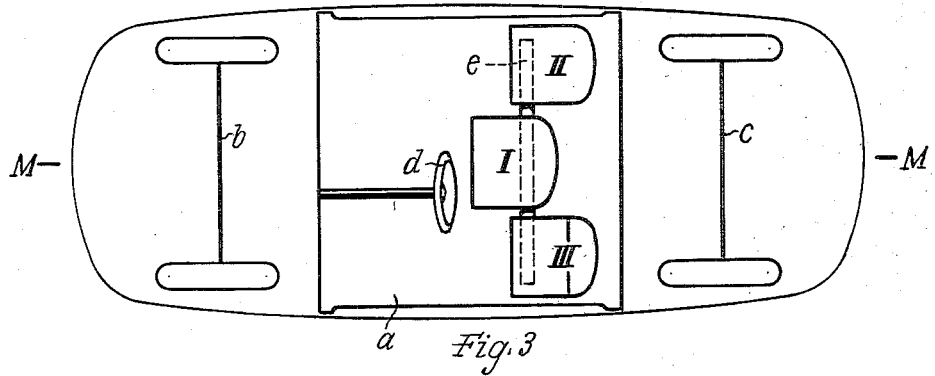
Fig. 3 is a modification of Fig. 1 with the steering gear off center.

In order to avoid excessive lateral offsetting of the steering handwheel relative to the laterally displaced seat according to Fig. 2, the steering handwheel may be set off relative to the center plane, so that it is located, for instance approximately in the center between the center plane of the seat I according to Fig. 1 and the center plane of the seat I according to Fig. 2. Such an arrangement of the steering column is shown in Fig. 3.

The steering wheel shaft, if apropriate, may alternatively be made adjustable, for instance together with a steering tube enclosing the steering wheel shaft, for instance by using one or two flexible couplings or the like to make them pivotable or transversely slideable to a certain extent.

Figure 4:
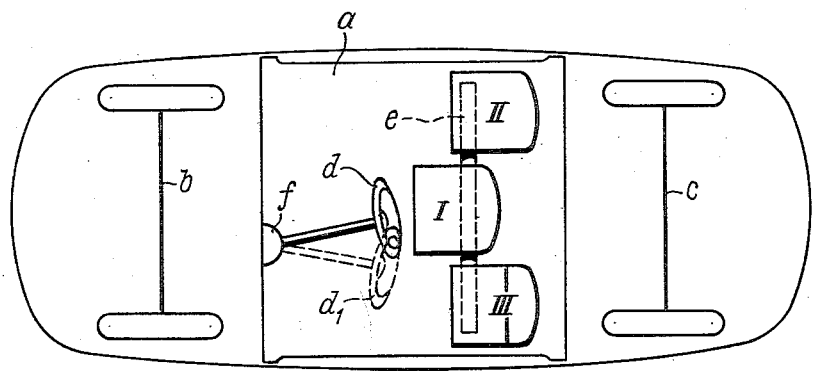
Fig. 4 is a plan view of another embodiment provided with adjustable steering gear.

Fig. 4 shows one example of such adjustability. In this instance, the steering column with the steering handwheel $d$ is pivotable, for instance, about a joint $f$ at the lower end of the steering wheel shaft, and is lockable, for instance in the positions $d$ and $d'$ of the steering handwheel, for instance adjacent to the joint $f$, or in a coulisse adjacent to the steering handwheel.

The steering wheel shaft can be made adjustable either jointly with the center seat or independently thereof.

Figure 5:
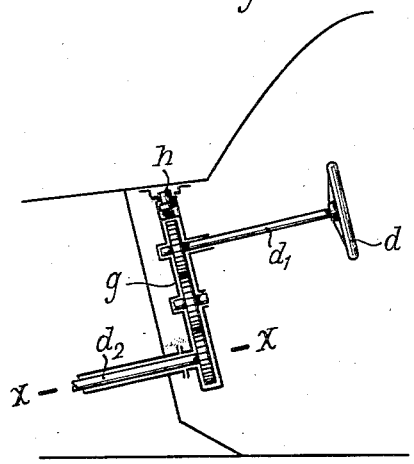
Fig. 5 is a longitudinal section through a vehicle according to another embodiment provided with adjustable steering gear.

In the embodiment according to Fig. 5, the steering handwheel $d$, together with the upper portion $d_1$ of the steering wheel shaft and a gearing $g$, is pivotable about the axis $x$—$x$ of the lower portion $d_2$ of the steering wheel shaft and is lockable at the car body, as by spring-loaded catches $h$ or the like. The gearing $g$ transfers the movement of the steering wheel from the upper steering wheel shaft portion $d_1$ to the lower steering wheel portion $d_2$.

What we claim is:

1. A motor vehicle of such width as to permit side-by-side arrangement of three seats, comprising a center seat and two side seats arranged laterally of the two sides thereof, wherein said center seat and one of said side seats are slidably arranged transversely of the vehicle and the lateral third seat is arranged at one side of the two aforementioned slidably arranged seats and acts as an emergency seat being foldable to a position out of the line of transverse movement of said center seat.

2. A motor vehicle including a plurality of front seats arranged in side-by-side relationship and being slidable transversely of the vehicle and a steering gear operating device secured to the vehicle forwardly of said seats, one of said seats being slidable transversely of the vehicle by such an amount as to be adjustable between an end position to the left of the center line of the steering gear operating device and another end position to the right thereof.

3. A motor vehicle of such width as to permit side-by-side arrangement of three seats, comprising a center front seat, a lateral front seat, and a third seat connected to the vehicle and to be unfolded from a folded position rearwardly of said two front seats to a position substantially in line with the said two front seats, and a steering gear operating device, one of said two front seats being slidable transversely of the vehicle by such an amount as to enable said seat to be adjusted between an end position to the left of the center line of said steering gear operating device and another end position to the right thereof.

4. A motor vehicle of such width as to permit side-by-side arrangement of three seats, comprising a center seat and two side seats arranged laterally of the two sides thereof, wherein said center seat and one of said side seats are slidably arranged transversely of the vehicle and the lateral third seat is arranged at one side of the two aforementioned slidably arranged seats and being an emergency seat foldable to a position out of the line of transverse movement of said center seat, wherein said center seat is somewhat forwardly displaced relatively to said two lateral seats.

5. A motor vehicle of such width as to permit side-by-side arrangement of three seats, comprising a center front seat, a lateral front seat, and a third seat connected to the vehicle and to be unfolded from a folded position rearwardly of said two front seats to a position substantially in line with the said two front seats, and a steering gear operating device, one of said two front seats being slidable transversely of the vehicle by such an amount as to enable said seat to be adjusted between an end position to the left of the center line of said steering gear operating device and another end position to the right thereof, wherein said steering gear operating device is arranged substantially centrally of the sliding range of said last-named seat.

6. A motor vehicle of such width as to permit side-by-side arrangement of three seats, comprising a center seat and two side seats arranged laterally of the two sides thereof, wherein said center seat and one of said side seats are slidably arranged transversely of the vehicle and the lateral third seat is arranged at one side of the two aforementioned slidably arranged seats and being an emergency seat foldable to a position out of the line of transverse movement of said center seat, wherein said central seat can be moved from a central position in the vehicle to a lateral position therein, with a steering gear operating device arranged to one side of a vertical center plane of the vehicle within the sliding range of said central seat.

7. A motor vehicle of such width as to permit side-by-side arrangement of three seats, comprising a center seat and two side seats arranged laterally of the two sides thereof, wherein said center seat and one of said side seats are slidably arranged transversely of the vehicle and the lateral third seat is arranged at one side of the two aforementioned slidably arranged seats and being an emergency seat foldable to a position out of the line of transverse movement of said center seat, and a steering gear operating device connected to the vehicle forwardly of the seats and being adjustable transversely of the vehicle.

8. A motor vehicle of such width as to permit side-by-side arrangement of three seats, comprising a center seat and two side seats arranged laterally of the two sides thereof, wherein said center seat and one of said side seats are slidably arranged transversely of the vehicle and the lateral third seat is arranged at one side of the two aforementioned slidably arranged seats and being an emergency seat foldable to a position out of the line of transverse movement of said center seat, a steering column and means for permitting limited pivoted movement of the steering column transversely of the vehicle.

9. A motor vehicle of such width as to permit side-by-side arrangement of three seats, comprising a center seat and two side seats arranged laterally of the two sides thereof, wherein said center seat and one of said side seats are slidably arranged transversely of the vehicle and the lateral third seat is arranged at one side of the two aforementioned slidably arranged seats and being an emergency seat foldable to a position out of the line of transverse movement of said center seat, a steering gear operating device connected to the vehicle forwardly of the seats and being adjustable transversely of the vehicle, said device further comprising a steering hand wheel and gear means for enabling said hand wheel to be moved from side to side about an axis substantially parallel to the axis of said hand wheel.

References Cited in the file of this patent

UNITED STATES PATENTS

| 1,640,640 | Bourgon | Aug. 30, 1927 |
| 2,297,176 | Thompson | Sept. 29, 1942 |
| 2,436,153 | Sanmori | Feb. 17, 1948 |

FOREIGN PATENTS

| 321,242 | Italy | Sept. 28, 1934 |